Patented Sept. 26, 1922.

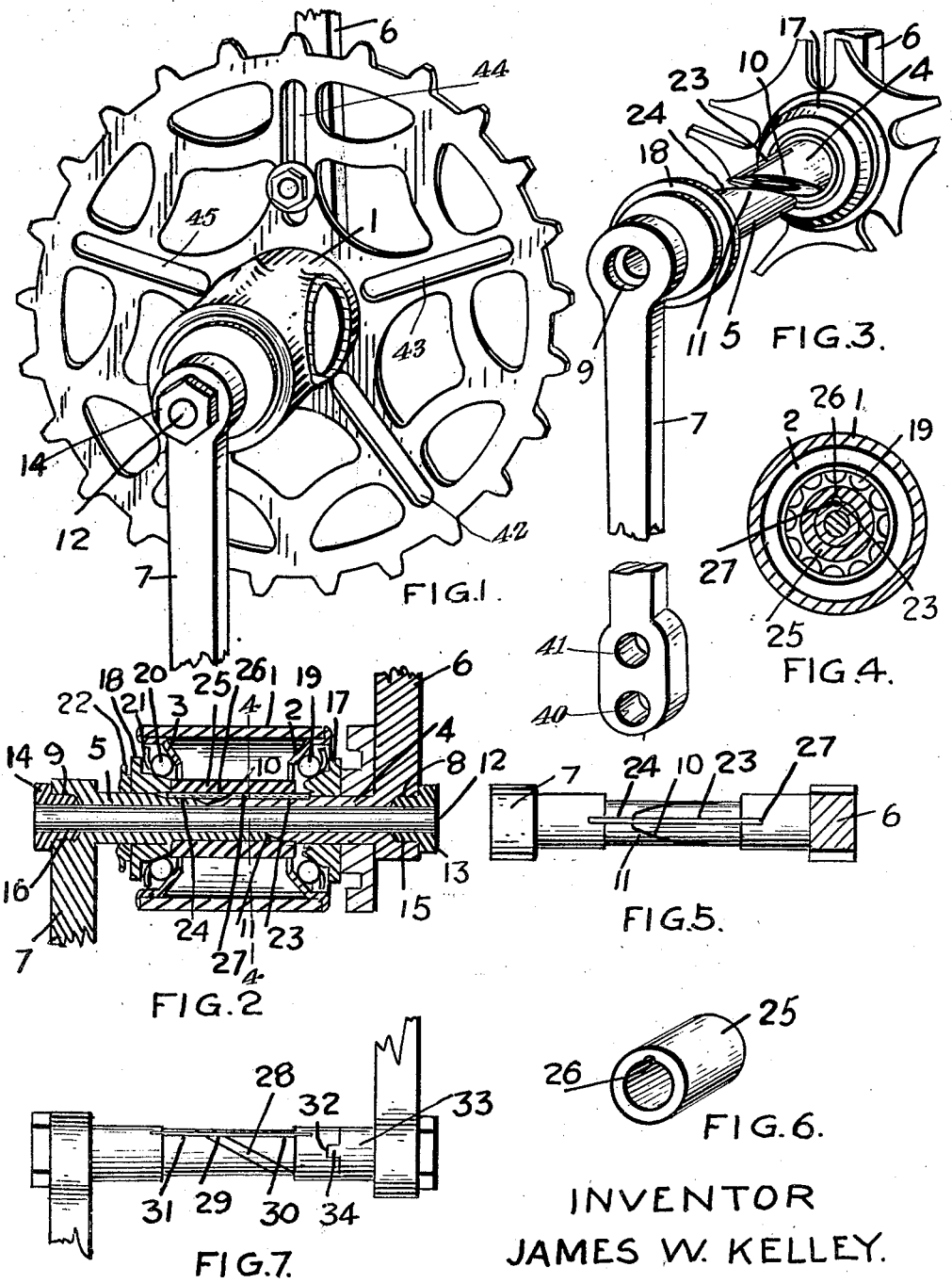

1,430,235

UNITED STATES PATENT OFFICE.

JAMES WESLEY KELLEY, OF OAKVILLE, ONTARIO, CANADA.

BICYCLE-CRANK-HANGER CONSTRUCTION.

Application filed July 25, 1921. Serial No. 487,223.

*To all whom it may concern:*

Be it known that I, JAMES WESLEY KELLEY, a subject of the King of Great Britain, of the town of Oakville, in the county of Halton, in the Province of Ontario, Canada, have invented certain new and useful Improvements in Bicycle-Crank-Hanger Constructions, of which the following is the specification.

My invention relates to improvements in bicycle crank hanger constructions and the object of the invention is to devise means whereby the crank axle may be readily removed without disturbing the bearing cones in the event of the breaking of the ball bearings, or the necessity of cleaning such bearings and thereby obviating the readjustment of the cones when replacing the axle, and yet at the same time providing a construction which provides an axle which will be rigid, strong and durable and such as may be readily adapted to bicycles of various types and it consists essentially of the arrangement and construction of parts as hereinafter more particularly explained.

Fig. 1 is a perspective view of my crank hanger construction, showing the centre bracket of a bicycle and the main sprocket and cranks.

Fig. 2 is a sectional view through Fig. 1 the major portion of the main sprocket being broken away.

Fig. 3 is a perspective detail of my divided axle removed from the centre bracket, the members of the bracket being slightly separated apart.

Fig. 4 is a cross sectional view on line 4—4, Fig. 2.

Fig. 5 is a detail view of my crank axle showing the key connection between the members thereof.

Fig. 6 is a perspective detail of the securing sleeve surrounding the joint between the divided members of the axle.

Fig. 7 is a detail view of my crank axle adapted for use in repair work.

In the drawings like characters of reference indicate corresponding parts in each figure, 1 indicates the centre bracket of a bicycle frame in which is located the ball bearing cups 2 and 3. 4 and 5 are two axle members forming the crank axle one member being provided with the crank 6 and the other with the crank 7 which are formed integral therewith.

The axle members 4 and 5 are hollow, the ends being provided with recesses 8 and 9. The inner ends of the members 4 and 5 are cut obliquely as indicated at 10 and 11, the oblique ends fitting one against the other as clearly indicated in Fig. 2.

12 is a bolt which extends through the hollow members 4 and 5 and is provided with securing nuts 13 and 14 provided with bosses 15 and 16 fitting into the recesses 8 and 9.

Although I have shown the bolt 12 as provided with a nut at each end, it will of course be understood that one end of the bolt might be provided with a head formed integral with the bolt and the other end with a nut.

17 and 18 are the cones of the ball bearings which are threaded in the usual manner upon the members 4 and 5 of my axle so as to oppose the cups 2 and 3 and between which are located the usual balls 19 and 20, held in the usual ball retainers 21.

22 is a locking nut which bears against the outer cone 18. The members 4 and 5 of the axle are provided with longitudinally aligned grooves 23 and 24. 25 is a sleeve which surrounds the divided portions of the axle so as to cover the joint.

26 is an internal groove extending longitudinally of the sleeve 25, such groove registering with the grooves 23 and 24. The grooves 23 and 24 are preferably semi-circular as is also the groove 26.

27 is a key wire which is forced longitudinally into the orifice formed by the grooves 23, 24 and 26 thereby securely keying the members 4 and 5 of the axle together so that they cannot move one in relation to the other.

It will thus be seen that an absolutely rigid and solid construction of axle is provided, the bolt 12 definitely preventing outward longitudinal movement of the axle members 4 and 5 away from each other, and the key 27 and sleeve 25 with the co-acting grooves 23, 24 and 26 prevent any tendency to a relatively rotary movement of one axle member in regard to the other.

When it is necessary to adapt my axle to other types of bicycles having a wider centre bracket, I either insert an insert piece 28 (see Fig. 7) between the ends of the divided axle, such insert piece being provided with a groove 29 in longitudinal alignment with the grooves 30 and 31 and corresponding to the grooves 23 and 24 of the construction shown in Figs. 2, 4 and 5, and through which a key wire corresponding to the key wire 27 of Fig. 2 is inserted, or use the alternative construction also shown in Fig. 7, this alternative construction being provided for by dividing one member of the axle and forming a recess 32 in the outer end of the inner portion of the divided member and providing a member 33 which may vary in length according to the type of wheel to which it is to be applied and forming it integral with the crank, the inner end of the portion 33 being provided with a tooth 34 fitting into the recess 32. The centre bolt corresponding to the centre bolt 12 shown in Fig. 2, secures the divided members of the axle together with the tooth 34 absolutely locked within the recess 32 making a solid construction so that the axle turns as one unit.

From this description it will be seen that I have devised a very simple construction of divided axle. Should one of the balls or any other part of the bearing break, or should it be necessary to clean the bearings all it is required to do is to remove the bolt 12 and then draw out the members 4 and 5 of the axle in opposite directions, the cones 17 and 18 of the bearing being drawn therewith. Of course during this operation the key 27 is drawn from the grooves 23 and 24, the inner ends of the divided axle passing from the interior of the sleeve 25. The broken part may then be renewed and the axle reinserted without disturbing the position of the cones 17 and 18 thereon.

If desired two holes may be made at the end of the crank hanger as illustrated at 40 and 41 so that should the crank end break the pedal axle may be secured in the other hole.

42, 43, 44 and 45 are slots formed in the sprocket wheel, 46 is a bolt extending through a slot and the crank 6, thereby enabling a crank of any size being attached.

What I claim as my invention is:

1. In a crank hanger construction, the combination with the centre bracket bearing cups and balls, of a divided axle, each member having a longitudinal groove in longitudinal alignment one with the other, means for tying the divided members of the axle longitudinally together, a bearing cone carried by each member of the divided axle coacting with the balls and cups of the centre bracket, a sleeve surrounding the joint between the members of the divided axle and having an internal longitudinal groove opposing the grooves of the divided axle, and a key adapted to be inserted to engage both the grooves of the divided axle and the groove of the sleeve.

2. In a crank hanger construction, the combination with the centre bracket bearing cups and balls, of a hollow divided axle having its inner ends cut obliquely and abutting one against the other and having a groove in each member in longitudinal alignment one with the other, a tie bolt extending through the members of the axle, a cone carried by each member of the axle and coacting with the balls and cups of the centre bracket, a crank formed integral with each member of the axle, a sleeve covering the oblique joint between the members of the divided axle and having a longitudinal internal groove opposite the grooves of the divided axle, and a key strip inserted within the grooves of the divided axle and the groove of the sleeve.

3. In a bicycle hanger construction, the combination with the centre bracket bearing cups and balls, of a divided axle, a crank carried by each member of the axle, cones carried by the members of the axle coacting with the balls and cups of the centre bracket, an insert piece adapted to fit between portions of the axle to extend it longitudinally and means for tying the members of the axle together to prevent outward longitudinal movement and relatively rotary movement.

JAMES WESLEY KELLEY.